United States Patent [19]
Pan et al.

[11] Patent Number: 5,685,008
[45] Date of Patent: Nov. 4, 1997

[54] COMPUTER PROCESSOR UTILIZING LOGARITHMIC CONVERSION AND METHOD OF USE THEREOF

[75] Inventors: Shao Wei Pan, Schaumburg; Shay-Ping Thomas Wang, Long Grove; Scott Edward Lloyd, Hoffman Estates; Nicholas Mikulas Labun, Chicago; David Alan Hayner, Arlington Heights, all of Ill.

[73] Assignee: Motorola, Inc., Schaumburg, Ill.

[21] Appl. No.: 403,158

[22] Filed: Mar. 13, 1995

[51] Int. Cl.[6] ........................................ G06F 1/02
[52] U.S. Cl. ................................. 395/800; 364/722
[58] Field of Search .................... 395/800; 369/722, 369/748.5

[56] References Cited

U.S. PATENT DOCUMENTS

| | | | |
|---|---|---|---|
| 3,551,663 | 12/1970 | Herron et al. | 235/159 |
| 3,748,451 | 7/1973 | Ingwersen | 235/156 |
| 3,922,536 | 11/1975 | Hampel et al. | 235/152 |
| 3,941,990 | 3/1976 | Rabasse | 235/176 |
| 3,967,100 | 6/1976 | Shimomura | 235/152 |
| 4,156,922 | 5/1979 | Majerski et al | 364/757 |
| 4,626,825 | 12/1986 | Burleson et al. | 340/347 |
| 4,905,143 | 2/1990 | Takahashi et al. | 364/200 |
| 4,949,292 | 8/1990 | Hoshino et al. | 364/736 |
| 5,042,001 | 8/1991 | Brightman et al. | 364/736 |
| 5,068,816 | 11/1991 | Noetzel | 364/718 |
| 5,073,867 | 12/1991 | Murphy et al. | 395/27 |
| 5,220,559 | 6/1993 | Tsuzuki et al. | 370/60 |
| 5,278,945 | 1/1994 | Basehore et al. | 395/27 |
| 5,343,254 | 8/1994 | Wada et al. | 348/627 |
| 5,600,581 | 2/1997 | Dworkin | 364/722 |

FOREIGN PATENT DOCUMENTS

| | | |
|---|---|---|
| 0218971 | 9/1986 | European Pat. Off. |
| WO87/07053 | 11/1987 | WIPO |
| WO93/17383 | 9/1993 | WIPO |

OTHER PUBLICATIONS

A Logarithmic Vector Processor for Neural Net Applications by Steve Richfield, Neurosoft, IEEE First International Conference on Neural Networks, Sheraton Harbor Island East, San Diego, California, Jun. 21–24, 1987.

A Multiplier–Less Digital Neural Network by L. Spaaneburg, B. Hoefflinger, S. Neusser, J.A.G. Nijhuis, A. Siggelkow, IMS, Stuttgart, Germany, Proceedings of the 2nd Int'l Conference on Microelectronics for Neural Networks, Oct. 16–18, 1991, Munich, F.R. Germany pp. 281–289.

Algorithm Design for a 30 bit Integrated Logarithmic Processor by David M. Lewis and Lawrence K. Yu, Department of Electrical Engineering, Univeresity of Toronto, Proceeding 9th Symposium on Computer Arithmetic, 1989, IEEE Comp. Soc. Press, pp. 192–199.

An Architecture for Addition and Subtraction of Long Word Length Numbers in the Logarithmic Number System by David M. Lewis, Member, IEEE, IEEE Transactions on Computers, vol. 39, No. 11, Nov. 1990, pp. 1325–1336.

A 30–b Integrated Logarithmic Number System Processor by Lawrence K. Yu, Member, IEEE, and David M. Lewis, Member, IEEE, IEEE Journal of Solid–State Circuits, vol. 26, No. 10, Oct. 1991, pp. 1433–1440.

(List continued on next page.)

*Primary Examiner*—Eric Coleman
*Attorney, Agent, or Firm*—Michael K. Lindsey; Bruce E. Stuckman

[57] ABSTRACT

A computer processor for performing mathematical operations includes a logarithm converter which generates log values on a data bus, a plurality of processing elements connected to the data bus, an inverse-logarithm converter which receives values from the processing elements, an accumulator which sums converted values from the inverse-logarithm converter, and a control unit for configuring the accumulator to perform various summing operations. The computer processor also includes a switch for providing processor outputs as feedback. An instruction, selected from a set of instructions, is decoded by the control unit to configure the computer processor to perform operations on a data stream.

46 Claims, 9 Drawing Sheets

OTHER PUBLICATIONS

An Accurate LNS Arithmetic Unit Using Interleaved Memory Function Interpolator by David M. Lewis, Department of Electrical Engineering, University of Toronto, Proceeding 11th Symposium on Computer Arithmetic, 1993, IEEE Comp. Soc. Press, pp. 2–9.

Interleaved Memory Function Interpolators with Application to an Accurate LNS Arithmetic Unit by David M. Lewis, Member, IEEE, IEEE Transactions on Computers, vol. 43, No. 8, Aug., 1994, pp. 974–982.

Table–Lookup Algorithms for Elementary Functions and Their Error Analysis by Ping Tak Peter Tang, Matematics and Computer Schience Division, Argonne National Laboratory, 9700 S. Cass Ave., Argonne, IL 60439–4801, Proceeding 10th Symposium on Computer Arithmetic, Jun. 1991, pp. 232–236.

Applying Features of IEEE 754 to Sign/Logarithm Arithmetic by Mark G. Arnold, Member, IEEE, Thomas A. Bailey, Member, IEEE John R. Cowles, and Mark D. Winkel, IEEE Transactions on Computers, vol. 41, No. 8, Aug. 1992, pp. 1040–1050.

D8.13 Improved Accuracy for Logarithmic Additon in DSP Applications by Mark G. Arnold, John Cowles, and Thomas Bailey, Computer Science Department, University of Wyoming, Laramie, WY, ICASSP 88: Int. Conf. on Acoustics, Speech and Signal Processing, vol. 3 pp. 1714–1717.

Redundant Logarithmic Number Systems by M.G. Arnold, T.A. Bailey, J.R. Cowles, J.J. Cupal, University of Wyoming, Wy, Proceeding of 9th Symposium on Computer Arithmetic, pp. 144–151, IEEE Comp. Soc. Press.

Comments on "An Architecture for Addition and Subtraction of Long Word Length Numbers in the Logarithmic Number System"[1] by M. Arnold, T. Bailey and J. Cowles, IEEE Transactions on Computers, vol. 41, No. 6, Jun. 1992, pp. 786–788.

Redundant Logarithmic Arithmetic, Mark G. Arnold, Member IEEE, Thomas A. Bailey, Member IEEE, John R. Cowles, and Jerry J. Cupal, Members IEEE, IEEE Transactions on Computers, vol. 39, No. 8, Aug. 1990, pp. 1077–1086.

The Efficient Implemetation and Analysis of a Hybrid Number System Processor, Fang–shi Lai, IEEE Transactions on Circuits and Systems, II: Analog and Digital Signal Processing vol. 40, No. 6, Jun. 1993, pp. 382–392.

Polynomial and Standard Higher Order Neural Network, Chir–Ho Chang, Jin–Ling Lin, and J.Y. Cheung, Electrical Engineering and Computer Science, University of Oklahoma, 1993 IEEE International Conference on Neural Networks, Mar. 28–Apr. 1, 1993, pp. 989–994.

A Digital Neuron–Type Processor and Its VLSI Design, Mahmoud K. Habib, Member, IEEE, and H. Akel, 8090 IEEE Transactions on Circuits and Systems 36(1989) May, No. 5, New York, US, pp. 739–746.

A Neural Feed–forward Network with a Polynomial Nonlinearity, Nils Hoffmann, Electronics Institute, Building 349, Technical University of Denmark, DK–2800 Lyngby, Denmark, Neural Networks for Signal Processing, Proceedings of the IEEE–SP Workshop, Aug. 31–Sep. 2, 199?, pp. 49–58.

A Polynomial time Algorithm for Generating Neural Networkes for Classification Problems, Asim Roy and Somnath Mukhopadhyay, Dept. of Decision and Information Systems, Arizona State University,IJCNN, 1992, 0–7803–0559–0/92 IEEE, pp. I–147–I–152.

Modeling systems with Polynomial Networks, Tools for Predicting Behavior, Peter D. Varhol, Programmer's Workbench, Dr. Dobb's Journal, Sep. 1993, Begins on p. 76.

AIM Outperforms Neural Networks and Regression, Mark Shewhart, USAF (IEEE Spectrum), AbTech Corporation, Charlotteville, VA 22903.

Polynomial Functions Can Be Realized by Finite Size Multilayer Feedforward Neural Networks, Naohiro TODA, Ken–ichi Funahashi and Shiro USUI, Department of Information and Computer Sciences, Toyohashi University of Technology, Tempaku, Toyohashi 441, Japan, 1991 IEEE International Joint Conference on Neural Networks, vol. 1of3, The Westin Stamford and Wesin Plaza, 18–21, Nov. 1991, Singapore.

An Artificial Neural Networks for Approximating Polynomial Functions, Behnam Malakooti and YingQing Zhou, Department of Ssytems Engineering, Center for Automation and Intellignet Systmes Research, Case Western Reserve University, Cleveland, Ohio, International Joint Conference on Neural Networks, Jun. 1992, pp. III–966–III–971.

Recursive Reduction in Finite Ring Computations, D. Zhang, G.A. Jullien, W.C. Miller, VLSI Research Group, Department of Electrical Engineering, University of Windsor, Windsor, Ontario Cananda N9B 3P4, Twenty–Third Asilomar conf. on Signals, systems and Computers, Conference Record vol. 2of2, pp. 854–857.

Robot Kinematics Learning Computations Using Polynomial Neural Networks, C.L. Philip Chen and A.D. McAulay, Department of Computer Science and Engineering, Wright State University, Dayton, OH 45435, Proceedings of the 1991 IEEE, International Cof. on Robotics and Automation, Sacramento, CA, Apr. 1991, pp. 2638–2643.

Backpropagation Based on the Logarithmic Error Function and Elimination of Local Minima, Kiyotoshi Matsuoka and Jianqiang Yi, Department of Control Engineering, Kyushu Institute of Technology, Sensul 1–1. Tobata. Kitakyushu, 804 Japan, Ch3065–0/91/0000–1117 IEEE, pp. 1117–1122.

Output Weight Optimization for the Multi–Layer Perceptron by M.T. Manry, Xiujun Guan, S.J. Apollo, L.S. Allen, W.D. Lyle, and W. Gong, Department of Electrical Engineering, University of Texas at Arlington, Arlington, Texas, Conference Record of the Twenty SIxth Asilomar conf. on Signals, Systems and Computers, Oct. 26–28, 1992, pp. 502–506.

Highly–automated, Non–parametric statistical learning for autonomous target recognition, Keith C. Drake, AbTech Corporation, 700 Harris Street, Charlottesville, Virginia 22903,pp. 1–10, Proceedings of the SPI 20th Applied Imagery Pattern Recognition Workshop, Oct. 1991, McLean, Virginia.

Generalization and Learning in Volterra and Radial Basis Function Networks: A Theoretical Analysis, Sean B. Holden and Peter J. W. Rayner, Cambridge University Engineering Department, Trumpington Street, Cambridge CB2 1PZ, U.K., 0–7803–0532–9/92, 1992 IEEE, pp. II–273–II–276.

On the Design Principles of the Functional Link Nets, Jun Wang and Ediberto P. Teixeira, Department of Systems Engineering, Case Western Reserve University, Cleveland, Ohio 44106, pp. 613–616, Ieee International Conf. on Systems Engineering, Aug. 9–11, 1990, Vista International Hotel, Pittsburgh, Pennsylvania, IEEE Catalog No:90CH2872–0.

A Neural Network Systems Component, Dean Mueller and Dan Hammerstrom, Adaptive Solutions, Inc, 1400 NW Compton Drive Suite 340, Beaverton, Oregon 97006, pp. 1258–1264, Neural Networks, 1993 International Conference.

Parallel Coprocessor for Kohonen's Self–Organizing Neural Network, Jukka Saarinen, Martti Lindroos, Jouni Tomberg and Kimmo Kaski, Tampere University of Technology, Microelectronics Laboratory, P.O. Box 527, SF–331011 Tampere, Finland, pp. 537–542 Parallel Processing, 1992 Symposium.

A Hybrid Number System Processor with Geometric and Complex Arithmetic Capabilities by Fang–shi Lai, and Ching–Farn Eric Wu, IEEE Transactions on Computers, vol. 40, No. 8, Aug. 1991, pp. 952–960.

A 3.84 GIPS Integrated Memory Array Processor with 64 Processing Elements and a 2–Mb SRAM by Nobuyuki Yamashita, Tohru Kimura, Yoshihiro Fujita, Yoshiharu Aimoto, Takashi Manabe, Shin'ichro Okazaki, Kazuyuki Nakamura, and Masalazu Yamashina, IEEE Journal of Solid–State Circuits, vol. 29, No. 11, Nov. 1994, pp. 1336–1343.

| 18 | 14 13 | 12 11 | 7 6 | 0 |
|---|---|---|---|---|
| INSTRUCTION ID | I/O MODE | CHIP ID | INSTRUCTION OFFSET | |

COMPUTER PROCESSOR UTILIZING LOGARITHMIC CONVERSION AND METHOD OF USE THEREOF

RELATED INVENTIONS

The present invention is related to the following inventions which are assigned to the same assignee as the present invention:

(1) "Neural Network Utilizing a Logarithmic Function and Method of Using Same", having Ser. No. 08/176,601, filed on Jan. 3, 1994.

(2) "Exponentiator Circuit Utilizing Shift Register and Method of Using Same", having Ser. No. 08/401,515, filed on Mar. 10, 1995 now U.S. Pat. No. 5,553,012.

(3) "Accumulator Circuit and Method of Use Thereof", having Ser. No. 08/455,927, filed on May 31, 1995.

(4) "Logarithm/Inverse-Logarithm Converter and Method of Using Same", having Ser. No. 08/381,368, filed on Jan. 31, 1995.

(5) "Logarithm/Inverse-Logarithm Converter Utilizing Second-Order Term and Method of Using Same", having Ser. No. 08/382,467, filed on Jan. 31, 1995.

The subject matter of the above-identified related inventions is hereby incorporated by reference into the disclosure of this invention.

FIELD OF THE INVENTION

The present invention relates generally to computers and, in particular, to a computer processor having multiple processing elements.

BACKGROUND OF THE INVENTION

Computer processors are well known and widely used for a variety of purposes. One application of computer processors is digital signal processing (DSP). By definition, digital signal processing is concerned with the representation of signals by sequences of numbers or symbols and the processing of these signals. DSP has a wide variety of applications and its importance is evident in such fields as pattern recognition, radio communications, telecommunications, radar, biomedical engineering, and many others.

At the heart of every DSP system is a computer processor which performs mathematical operations on signals. Generally, signals received by a DSP system are first converted to a digital format used by the computer processor. Then, the computer processor executes a series of mathematical operations on the digitized signal. The purpose of these operations may be to estimate characteristic parameters of the signal or to transform the signal into a form which is in some sense more desirable. Such operations typically implement complicated mathematics and entail intensive numerical processing. Examples of mathematical operations which may be performed in DSP systems include matrix multiplication, matrix-inversion, Fast Fourier Transforms (FFT), auto and cross correlation, Discrete Cosine Transforms (DCT), polynomial equations, and difference equations in general, such as those used to approximate Infinite Impulse Response (IIR) and Finite Impulse Response (FIR) filters.

Computer processors vary considerably in design and function. One aspect of a processor design is its architecture. Generally, the term computer architecture refers to the instruction set and organization of a processor. An instruction set is a group of programmer-visible instructions used to program the processor. The organization of a processor, on the other hand, refers to its overall structure and composition of computational resources, for example, the bus structure, memory arrangement, and number of processing elements. A processing element, in a broad sense, is a device in a computer processor that performs logical or arithmetical operations on data it receives. For example, a processing element may be as simple as an adder circuit which sums two values, or it may be a complex as a central processing unit (CPU) which performs a wide variety of different operations.

There are many different architectures, ranging from complex-instruction-set-computer (CISC) to reduced-instruction-set-computer (RISC) based architectures. In addition, some architectures have only one processing element, while others include two or more processing elements. Despite differences in architectures, all computer processors have a common goal, which is to provide the highest performance at the lowest cost. However, the performance of a computer processor is highly dependent on the problem to which the processor is applied, and few, if any, low-cost computer processors are capable of performing the mathematical operations listed above at speeds required for some of today's more demanding applications. For example, MPEG data compression of an NTSC television signal can only be performed using expensive supercomputers or special purpose hardware.

Many other applications, such as matrix transformations in real-time graphics, require data throughput rates which exceed the capabilities of inexpensive, single processors, such as microprocessors and commercially available DSP chips. Instead, these applications require the use of costly, multiprocessor or multiple-processor computers. Although multiprocessor computers typically have higher throughput rates, they also include complex instruction sets and are generally difficult to program.

Thus, there is a need for a computer processor that executes mathematical operations at high speeds, while remaining inexpensive. There is also a need for a computer processor which has a simple instruction set and is easily programmed to provide the desired mathematical operations. In addition, there is a need for a computer processor that enjoys a high data throughput rate. Such a processor should also be small in size and consume relatively little power.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Generally, the present invention provides a computer processor which receives a plurality of input signals and, in turn, generates at least one output signal. The input and output signals are typically construed as being binary values that represent numeric data. According to one aspect of the present invention, the computer processor includes: a logarithm converter which converts the input signals to corresponding log values; two or more processing elements which receive the log values and generate as output term values; an inverse-logarithm converter for converting the term values to corresponding converted values; an accumulator for summing ones of the converted values to produce at least one output signal; and a control unit which configures the accumulator to perform operations according to an instruction.

An advantage of the present invention is that it provides a computer processor which is capable of performing sophisticated mathematical operations at high processing speeds. The processor can be used for matrix multiplication, matrix-inversion, Fast Fourier Transforms (FFT), auto and cross correlation, Discrete Cosine Transforms (DCT), polynomial equations, L1 and L2 norm calculations, and difference equations in general, such as those used to approximate Infinite Impulse Response (IIR) and Finite Impulse Response (FIR) filters. Another advantage of the present invention is that it provides a computer processor which has a high data throughput rate. A further advantage of the present invention is that it provides a computer processor which is efficiently implemented in an integrated circuit, and is consequently small in size and consumes relatively little power.

Figure 1:
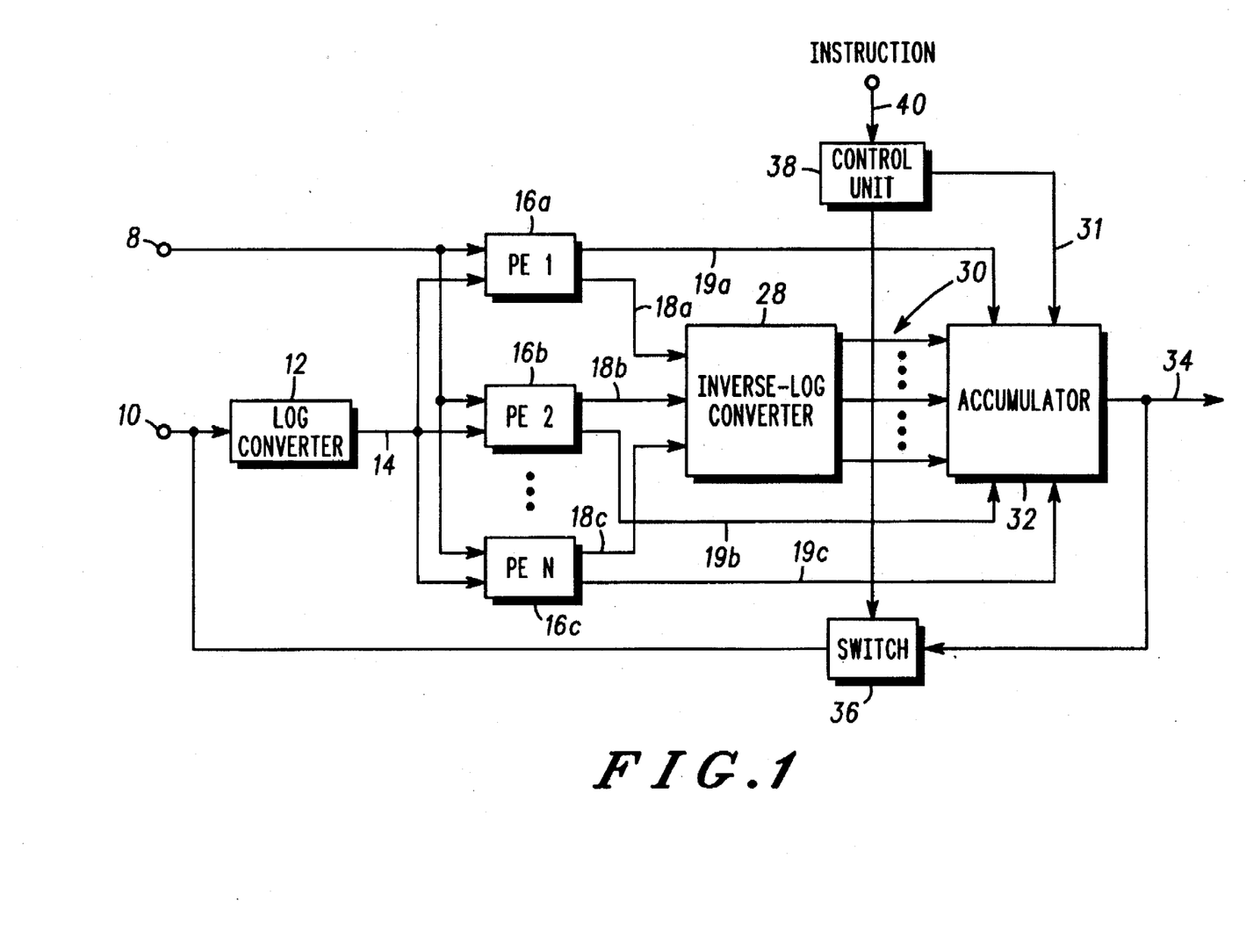
FIG. 1 illustrates a computer processor in accordance with one embodiment of the present invention.

FIG. 1 illustrates a computer processor in accordance with one embodiment of the present invention. The computer processor comprises a logarithm converter 12, and plurality of processing elements, an inverse-logarithm converter 28, a control unit 38, a feedback switch 36, and an accumulator 32. Three of the plurality of processing elements are represented in FIG. 1 by processing elements 16a, 16b, and 16c.

Operation of the computer processor typically proceeds as follows. Initially, the computer processor is configured for run-time execution. This is accomplished when an instruction is received by the control unit 38 over an instruction bus 40. The control unit 38 then decodes the instruction to generate a first control signal 31 and second control signal 33. The first control signal 31 is used to configure the accumulator 32 to perform specific summing operations, while the second control signal 33 is used to configure the feedback switch 36 in either an open or closed position.

Following initial configuration of the accumulator 32 and the feedback switch 36, a plurality of input signals may be received by the logarithm converter 12 via an input port 10. The logarithm converter 12 performs a logarithmic conversion on the plurality of input signals to generate a corresponding plurality of log values. The log values are then distributed across a bus 14 to the inputs of the plurality of processing elements 16a–16c. In addition to receiving the input signals, the computer processor may also receive a plurality of addresses corresponding to the input signals. The addresses are distributed across an address bus 8 to the plurality of processing elements 16a–16c. The addresses are used by the processing elements to retrieve stored data values corresponding to the inputs values.

Upon receiving the input signals, each processing element performs one or more operations which result in at least one term value being generated as output. The term values generated by the plurality of processing elements are represented by numerals 18a, 18b, and 18c. The inverse-logarithm converter 28 performs an inverse-logarithmic conversion on the term values 18a–18c to generate a plurality of converted values 30. In turn, the accumulator 32 sums selected ones of the converted values 30 to produce one or more output signals which are available on an output port 34.

The logarithm converter 12 can be any means for performing a logarithmic conversion on the input signals, including a computer program executing on a microprocessor. However, in a preferred embodiment of the present invention the logarithm converter 12 approximates a logarithmic function using linear regression. The logarithm converter 12 includes a lookup table (not shown) and an arithmetic means (not shown) for performing conversions as are well known to those skilled in the art. Input signals and log values may be any n-bit representation of numerical values; however, they are preferably represented by 23-bit floating point numbers having a format which includes one sign bit, a 6-bit exponent, and a 16-bit mantissa.

When a floating point number is received by the logarithm converter 12, the nine most significant bits of the mantissa are used as an address to retrieve a corresponding entry from the previously mentioned lookup table. The retrieved entry is then applied to the arithmetic means to generate the log value output from logarithm converter 12. Further details of the logarithm converter 12 used in a preferred embodiment are given in above-identified Related Invention No. 4.

In a another embodiment of the present invention, the logarithm converter 12 approximates a logarithmic function using a second-order regression. Input signals are represented by IEEE standard 32-bit floating point numbers. Using this format, each input signal has one sign bit, an 11-bit exponent, and a 23-bit mantissa. Further details of the logarithm converter used in this embodiment are given in above-identified Related Invention No. 5.

Each of the processing elements 16a–16c generates as output at least one term value 18a–18c, where:

$$y = w + \sum_{i=m}^{n} g_i x_i \qquad \text{Equation 1}$$

where y represents the term value, w represents a coefficient value, $x_i$ represents the ith log value received by the processing element, $g_i$ represents an exponent value corresponding to the ith log value, and i, m and n are any integers.

In a preferred embodiment, a processing element computes a term value using a digital circuit which implements shift-based multiplication as described in above-identified Related Invention No. 2.

Each processing element may include a cache memory (not shown) for storing at least one exponent and coefficient value. In this case, each address received across the address bus 8 corresponds to one of the input signals and is used to retrieve from the cache memory a coefficient and exponent value which correspond to the input signal.

The inverse-logarithm converter 28 can be any means for performing an inverse-log conversion on the term values 18a–18c, including a computer program running on a microprocessor or the inverse-logarithm converter as described in above-identified Related Invention No. 5. However, the inverse-logarithm converter 28 preferably has a structure identical to the inverse-logarithm converter disclosed in above-identified Related Invention No. 4, which structure includes a lookup table (not shown) and an arithmetic means (not shown). Optionally, the term values 18a–18c are represented by a binary value having an integer portion and a fractional portion, while the converted values are represented by 23-bit floating point numbers having a format which includes one sign bit, a 6-bit exponent, and a 16-bit mantissa, however, other structures are possible such as a 32-bit floating point format which is IEEE compatible. The fractional portion of the term values 18a–18c is used to retrieve entries from the lookup table. The retrieved entries are then applied to the arithmetic means to generate the corresponding converted values. Further details of the preferred inverse-logarithm converter can be found in above-identified Related Invention No. 4.

The accumulator 32 includes a plurality of summing circuits and configurable data paths, or routing paths. Essentially, the first control signal 31 enables various data paths for selected converted values to the inputs of the adder circuits. The first control signal 31 also enables data paths which route adder circuit outputs to other adder circuit inputs or to an output port 34. In a preferred embodiment of the present invention, the accumulator 32 has the structure and function of the accumulator circuit disclosed in above-identified Related Invention No. 3.

The accumulator may be configured to perform any one of four different functions. First, the accumulator 32 may be configured to function as an adder tree. In this configuration, the accumulator 32 generates output signals by summing converted values corresponding to selected ones of the plurality of processing elements. Second, the accumulator 32 may be configured to function as a plurality of individual accumulators. Under this configuration, each of the individual accumulators generates output signals by summing converted values from a designated one of the processing elements. Third, the accumulator 32 may be configured to function as an adder tree used in conjunction with an accumulation unit. In this configuration, the adder tree generates a sequence of adder outputs, over time, by summing converted values corresponding to selected ones of the processing elements, and the accumulation unit then sums the sequence of adder outputs to produce output signals. Under the fourth configuration, the accumulator 32 simply passes the converted values as output signals.

In addition to producing the output signals, the accumulator 32 can also generate output addresses which correspond to the output signals. The output addresses are made available on the output port 34 simultaneously with the corresponding output signals and can be used by external devices to identify individual output signals. In one embodiment of the present invention, the output addresses are stored in read-only-memories (ROMs, not shown) which are located in the processing elements 16a–16c. The processing elements 16a–16c pass the output addresses to the accumulator across respective buses 19a–19c. Each term value produced by the processing elements has an output address associated with it. In circumstances where converted values from different processing elements are combined into an output signal, the accumulator 32 selects one output address from a plurality of received output addresses and then associates the selected output address with the output signal. For instance, if the accumulator 32 is configured to produce an output signal by summing the converted values from processing elements one and two 16a–16b, then the accumulator could associate the output address from processing element one 16a with the output signal.

The feedback switch 36 provides output signals to the logarithm converter 12 in accordance with the second control signal 33 from the control unit 38. The condition of the second control signal 33 sets the feedback switch in either the open or closed position. In the closed position, output signals are provided as feedback. The condition of the second control signal 33 depends on the instruction decoded by the control unit 38. Instructions can operate the feedback switch in one of three ways. An instruction may either: (1) maintain the feedback switch 36 in the open position, thus providing no feedback; (2) close the feedback switch 36 after a predetermined interval; or (3) periodically open or close the feedback switch 36 at predetermined times during operation of the computer processor.

Feedback of output signals allows the computer processor to operate with much higher throughput during certain operations, such as computing L1 and L2 norms or an Infinite Impulse Response (IIR) digital filter, etc.

Although the computer processor of the present invention is preferably implemented as an integrated circuit, such as an ASIC, it will be understood by one of ordinary skill in the art that the computer processor of the present invention may be implemented in either hardware or software, or any combination thereof. For example, one version of the present invention could implement the logarithm converter 12 as a software program which is executable on a separate processor, such as a microprocessor, while the remaining elements of the computer processor could be included in a custom-designed integrated circuit which is connected to the separate processor.

Figure 2:
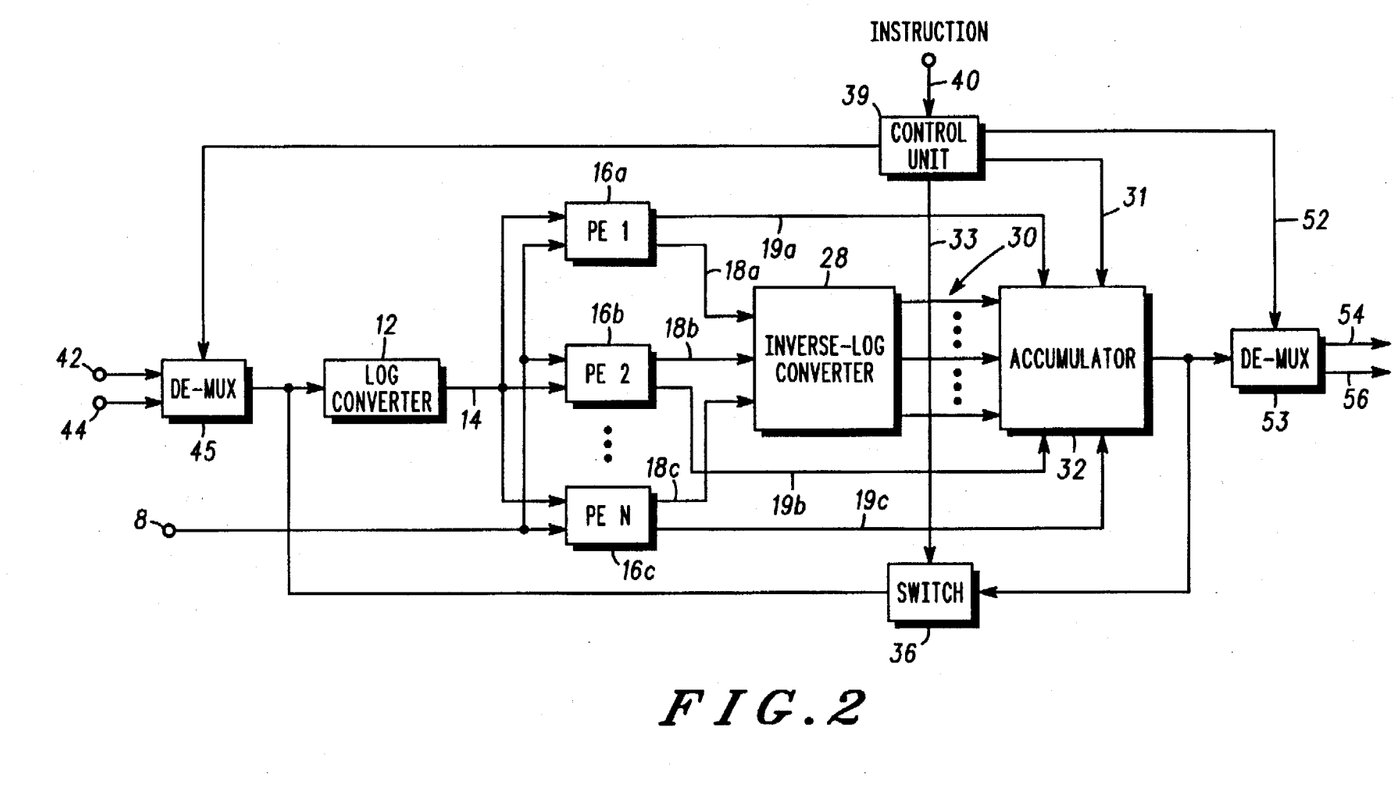
FIG. 2 illustrates a computer processor in accordance with a preferred embodiment of the present invention.

FIG. 2 illustrates a computer processor in accordance with a preferred embodiment of the present invention. In addition to the elements shown in FIG. 1, the computer processor preferably includes a multiplexer 45 and a de-multiplexer 53. The multiplexer 45 selects, according to a third control signal 46, input signals from either a first input port 42 or a second input port 44. The de-multiplexer 53 transmits, according to a fourth control signal 52, output signals to either a first output port 54 or a second output port 56. In addition to transmitting the output signals, the de-multiplexer 53 can also transmit output addresses to either of the output ports. The third and fourth control signals 46, 52 are generated by the control unit 39 when it decodes an instruction 40.

The dual input and output ports allow the computer processor to receive input signals from two different data streams and provide output signals to either of two receivers. This significantly improves the flexibility of the computer processor in many applications. For instance, two data streams having different data rates and processing requirements can be overlapped by the computer processor, thus increasing the overall data throughput of the processor.

Figures 3, 4, 5:
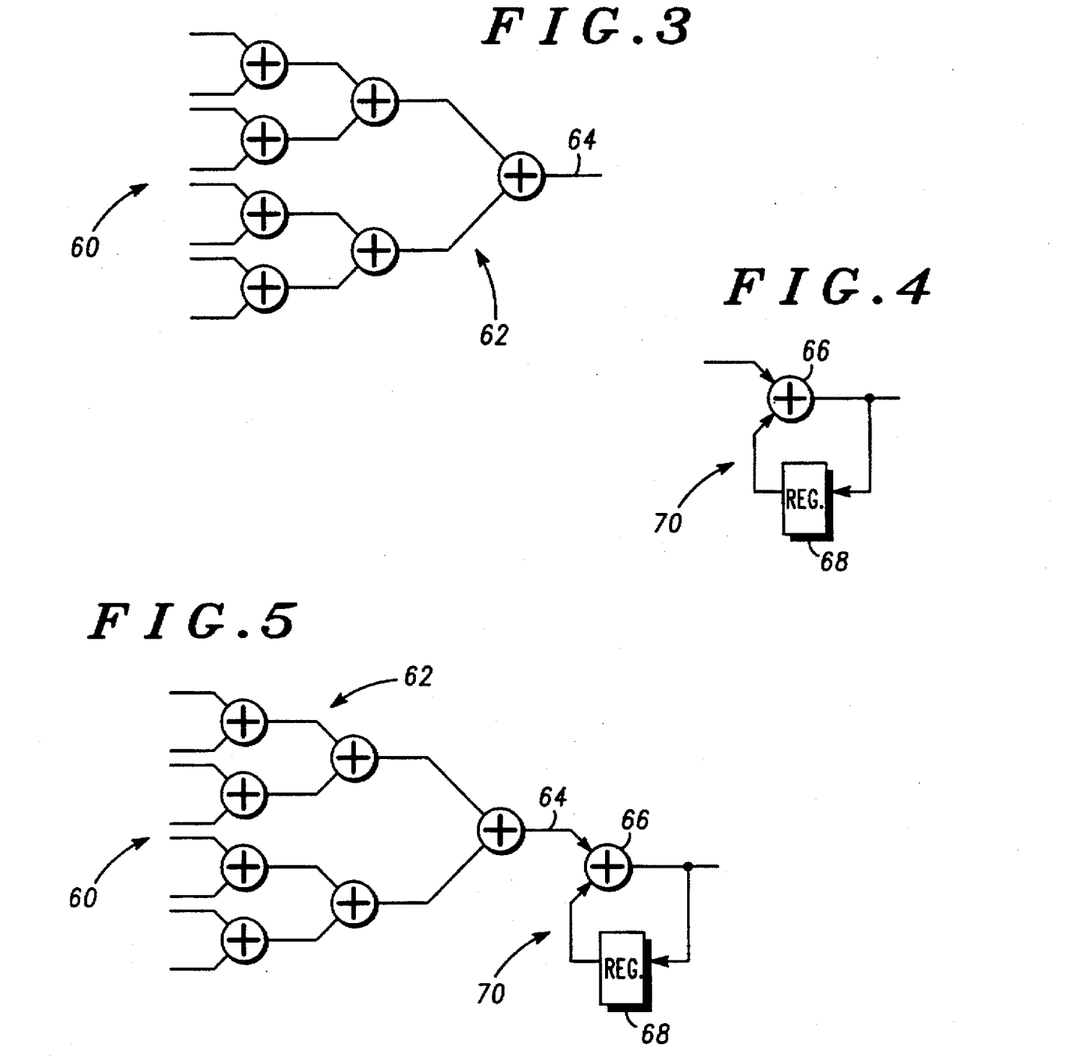
FIG. 3 shows a conceptual diagram of an adder tree.
FIG. 4 shows a conceptual diagram of an accumulation unit.
FIG. 5 illustrates an adder tree used in conjunction with an accumulation unit.

FIG. 3 shows a conceptual diagram of an adder tree 62. Adder tree 62 comprises a plurality of adder circuits which are connected together in the fashion shown to combine a plurality of adder tree inputs 60 into a single sum on an adder tree output 64. Many different digital adders exist which may be used to implement each adder circuit, including a carry-look-ahead or ripple adder. Each adder circuit sums two operands to produce a sum; thus, an adder tree requires n−1 adder circuits for n inputs. In the example shown, the adder tree 62 includes seven adder circuits and can sum eight inputs.

FIG. 4 shows a conceptual diagram of an accumulation unit 70. The accumulation unit comprises an adder circuit 66 for producing a sum and a register 68 for storing the sum. In addition, the register 68 provides the sum as input to the adder circuit 66. This allows the accumulation unit to sum a sequence of inputs. By setting the output of the register 68 to zero, the adder circuit 66 will simply pass inputs to the output of the accumulation unit.

FIG. 5 illustrates the adder tree 62 used in conjunction with the accumulation unit 70. This structure allows the adder tree inputs 60 to be summed, over a period of time, into a single value. A first set of input signals is received on the adder tree inputs 60 and then combined into a single sum on the adder tree output 64. The adder tree output 64 is then summed with the contents of register 68 to produce a further sum. In turn, the further sum is stored in the register 68, and the process is repeated when another set of inputs arrives at the adder tree inputs 60.

Figure 6:
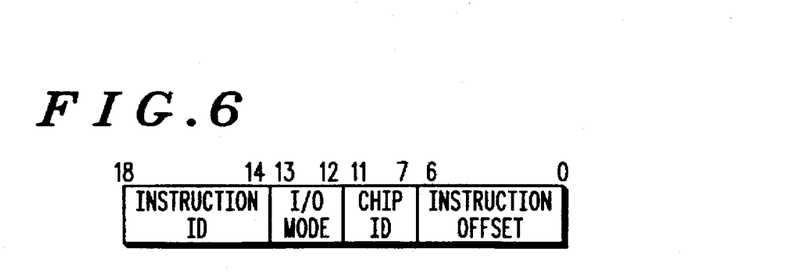
FIG. 6 illustrates an instruction format in accordance with a preferred embodiment of the present invention.

FIG. 6 illustrates an instruction format in accordance with a preferred embodiment of the present invention. Although one of ordinary skill will appreciate the fact that a computer instruction may assume many different formats and retain the same meaning, the instruction format of the present invention is preferably a 19-bit digital word which includes the following fields: an instruction ID, I/O mode, chip ID, offset, and address. The instruction ID is a 5-bit slice which indicates the identity of the instruction. Thus, the preferred format allows the instruction set of the computer processor to comprise up to 32 different instructions. As shown in FIG. 6, the instruction ID includes bits 14–18 of an instruction. The I/O mode is a 2-bit slice which is decoded to generate the third control signal 46 and the fourth control signal 52. These signals, in turn, configure the input and output ports of the computer processor. The I/O mode is located at bits 12–13 of an instruction. Bits 7–11 of an instruction give the chip ID. In a preferred embodiment, a computer processor has a corresponding 5-bit identification number. The computer processor decodes only those instructions with matching chip IDs. The chip ID field allows an instruction to be distributed to a plurality of computer processors on a common bus with only computer processors having matching identification numbers responding to the instruction. Bits 0–6 of an instruction give the instruction offset. The instruction offset is decoded to generate the first control signal 31, which in turn configures the accumulator 32.

Figure 7:
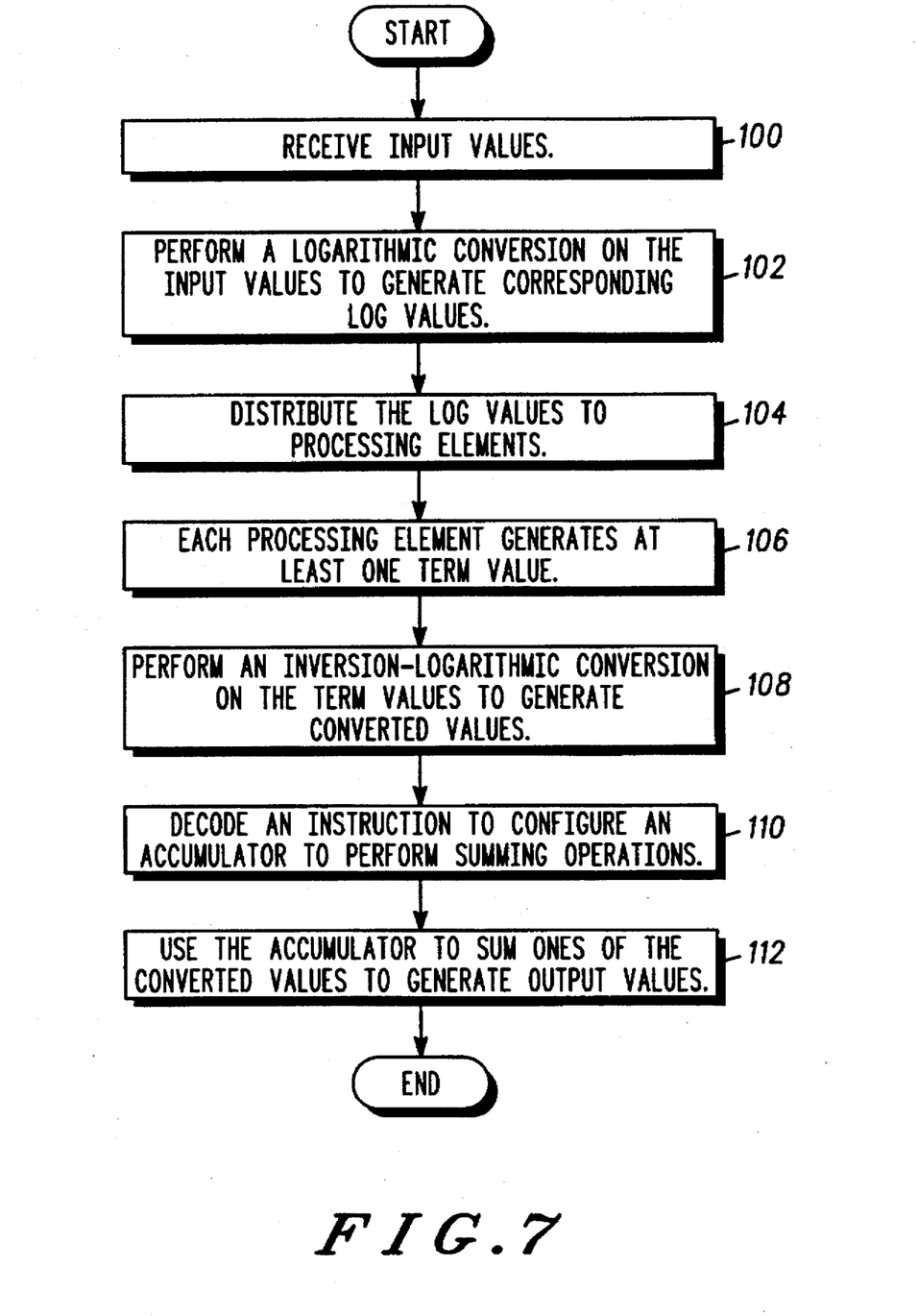
FIG. 7 shows a flow diagram of a method of using the computer processor of FIG. 1 to generate at least one output signal.

FIG. 7 shows a flow diagram of a method of using the computer processor of FIG. 1 to generate at least one output signal. In box 100, a plurality of input signals is received on the input port 10 of the computer processor. Next, in box 102, the logarithm converter 12 performs a logarithmic conversion on the input signals to generate a corresponding plurality of log values. In box 104, the log values are distributed to the plurality of processing elements 16a–16c. In box 106, each of the processing elements generates at least one term value as a result of receiving the log values. In box 108, an inverse-logarithmic conversion is performed on the term values to generate a plurality of converted values. In box 110, an instruction is decoded by the control unit 38 to generate the first control signal 31 which configures the accumulator 32 to perform summing operations. Next, in box 112, the accumulator 32 sums ones of the converted values to produce the at least one output signal on output port 34.

Referring to box 110, the accumulator 32 is configured to perform any of the four different functions as described above for FIG. 1. In one embodiment of the present invention, the step of configuring the accumulator 32, box 110, occurs before the step of receiving input signals, box 100.

Referring now to box 112, the computer processor may, in addition to the output signals, generate output addresses which correspond to the output signals. These output addresses can be used by devices coupled to the computer processor to identify individual output signals.

Figure 8:
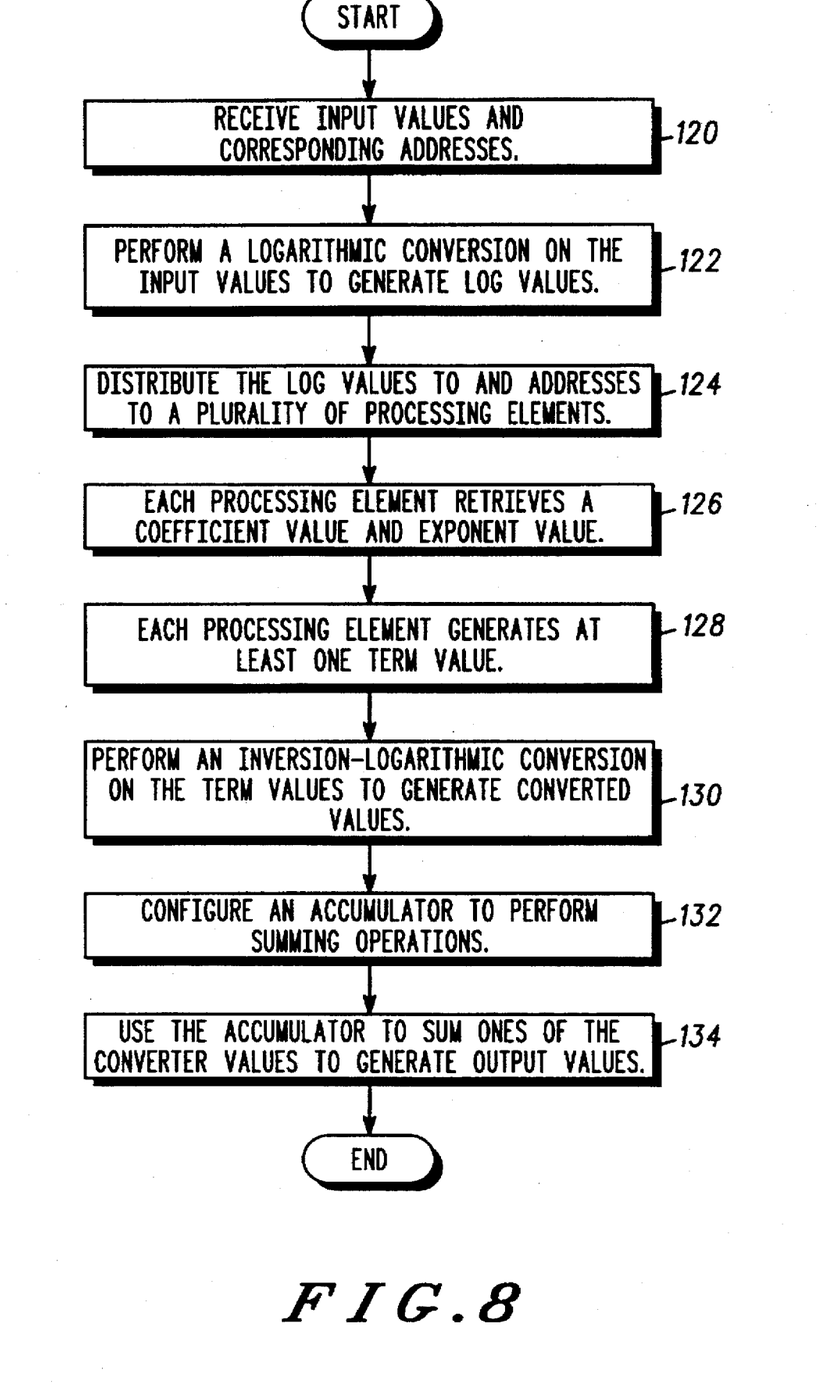
FIG. 8 shows a flow diagram of method of using the computer processor of FIG. 1 in which addresses are distributed to the processing elements.

FIG. 8 shows a flow diagram of a method of using the computer processor of FIG. 1 in which addresses are distributed to the processing elements. In contrast to the method shown in FIG. 7, the method shown in FIG. 8 includes steps for processing input signals and their corresponding addresses. In box 120, a plurality of input signals and their associated addresses are received by the computer processor. Next, in box 122, the logarithm converter 12 performs a logarithmic conversion on the input signals to generate a plurality of log values. In box 124, the log values and their respective addresses are distributed to the plurality of processing elements 16a–16c. In box 126, each processing element uses the addresses to retrieve coefficient and exponent values corresponding to the input signals. Next, in box 128, each of the processing elements generates at least one term value as a result of receiving the log values and retrieving the coefficient and exponent values. In box 130, an inverse-logarithmic conversion is performed on the term values to generate a plurality of converted values. In box 132, an instruction is decoded by the control unit 38 to generate the first control signal 31 which configures the accumulator 32 to perform summing operations. Next, in box 134, the accumulator 32 sums ones of the converted values to produce the at least one output signal on output port 34.

Referring to box 132, the accumulator 32 is configured to perform any of the four different functions as described above for FIG. 1. In one embodiment of the present invention, the step of configuring the accumulator 32, box 132, occurs before the step of receiving input signals, box 120.

Referring now to box 134, the computer processor may, in addition to the output signals, generate output addresses which correspond to the output signals. These output addresses can be used by devices coupled to the computer processor to identify individual output signals.

Figure 9:
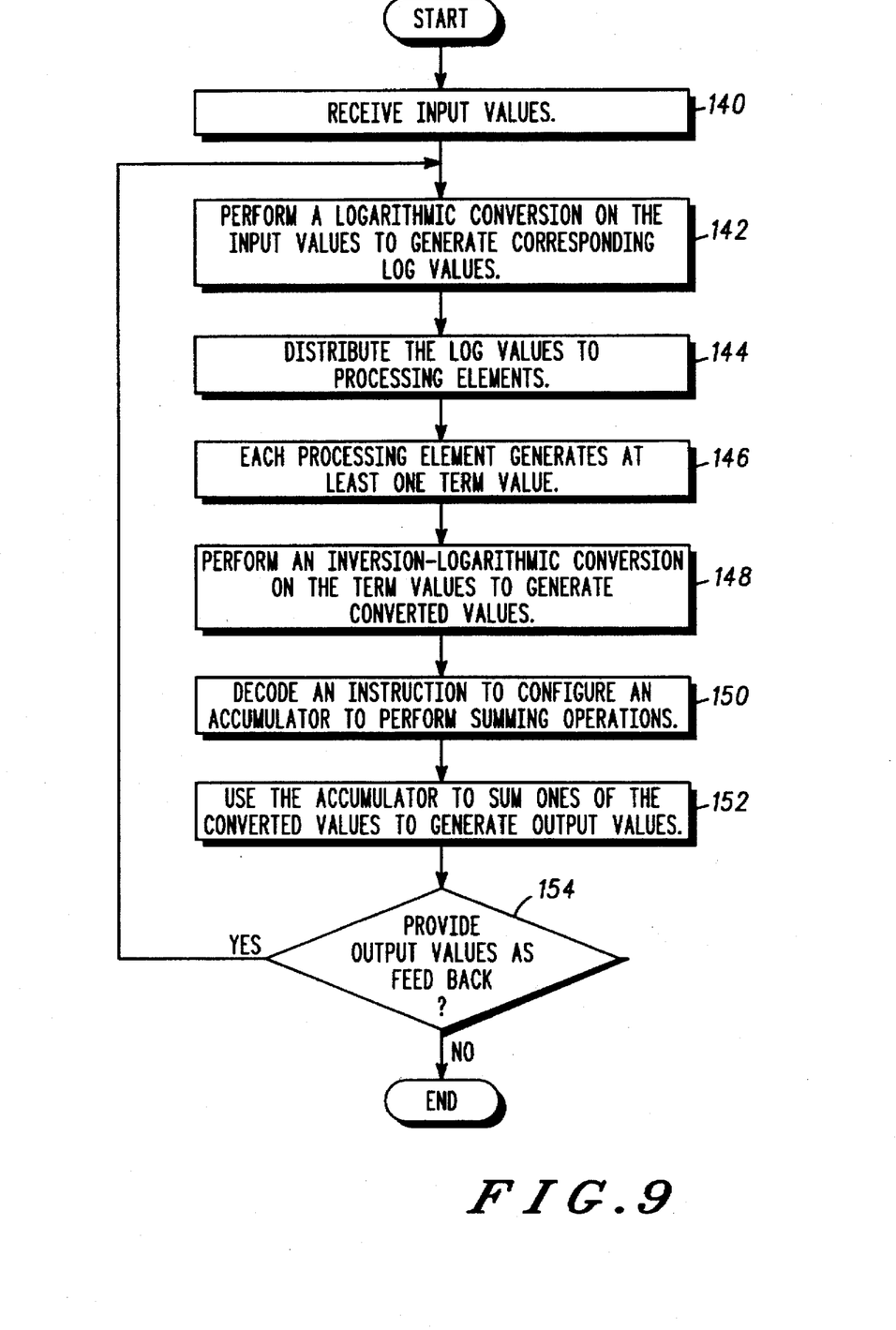
FIG. 9 shows a flow diagram of a method of using the computer processor of FIG. 1 in which output signals are utilized as feedback.

FIG. 9 shows a flow diagram of a method of using the computer processor of FIG. 1 in which output signals are utilized as feedback. Feedback of output signals allows the computer processor to operate with much higher throughput during certain operations, such as computing L1 and L2 norms or an Infinite Impulse Response (IIR) digital filter. In box 140, a plurality of input signals are received by the computer processor. Next, in box 142, the logarithm converter 12 performs a logarithmic conversion on the input signals to generate a plurality of log values. In box 144, the log values are distributed to the plurality of processing elements 16a–16c. In box 146, each processing element generates at least one term value as a result of receiving the log values. In box 148, an inverse-logarithmic conversion is performed on the term values to generate a plurality of converted values. In box 150, an instruction is decoded by the control unit 38 to generate the first control signal 31 which configures the accumulator 32 to perform summing operations. Next, in box 152, the accumulator 32 sums ones of the converted values to produce the at least one output signal on output port 34.

In decision box 154 a check is made to determine whether the output signals are to be provided as feedback. If so, the method returns to box 142 and the output signals are provided as inputs to the logarithm converter 12 via the feedback switch 36. If not, the method terminates. The determination of whether or not to provide feedback is based on the instruction decoded by the control unit 38.

Referring to box 150, the accumulator 32 is configured to perform any of the four different functions as described above for FIG. 1. In one embodiment of the present invention, the step of configuring the accumulator 32, box 150, occurs before the step of receiving input signals, box 140.

Referring now to box 152, the computer processor may, in addition to the output signals, generate output addresses which correspond to the output signals. These output addresses can be used by devices coupled to the computer processor to identify individual output signals.

Figure 10:
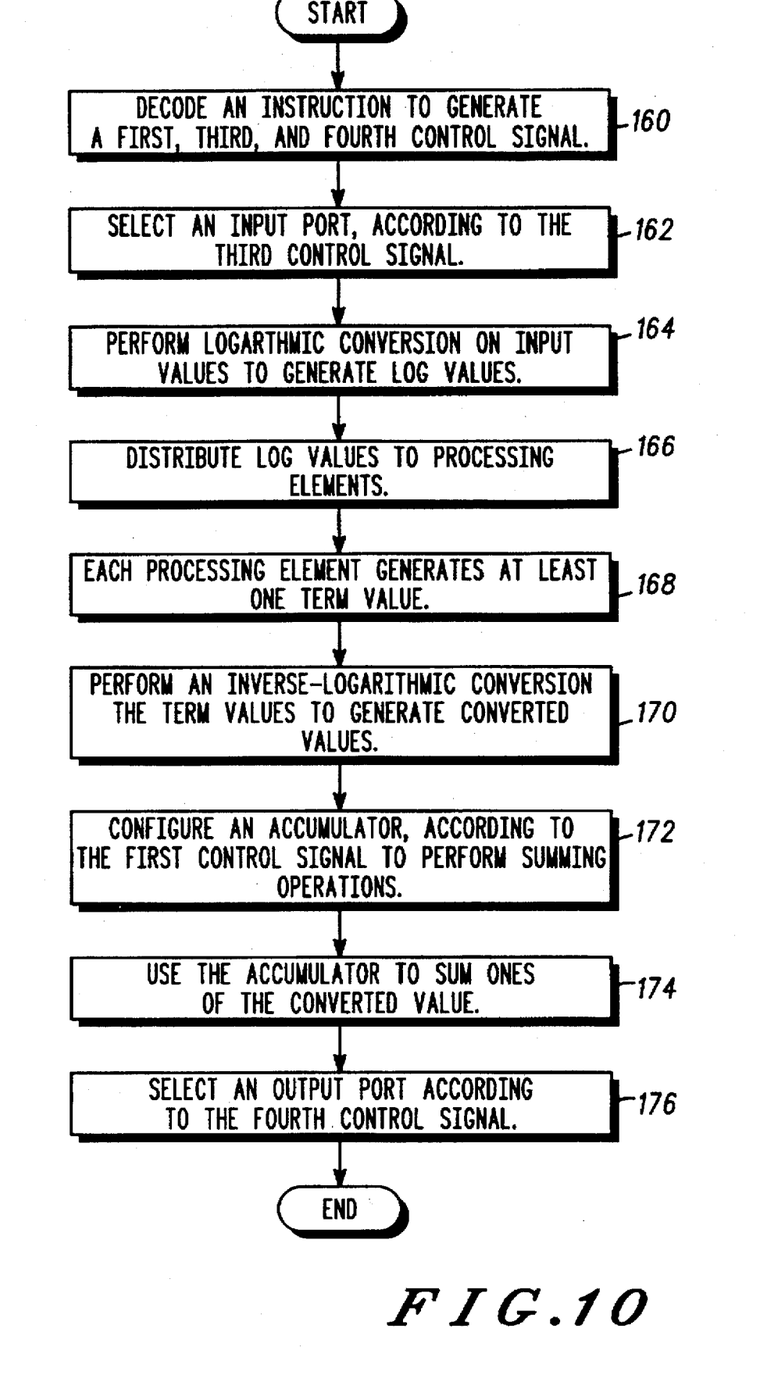
FIG. 10 shows a flow diagram of a method of using the computer processor of FIG. 2 to generate at least one output signal.

FIG. 10 shows a flow diagram of a method of using the computer processor of FIG. 2 to generate at least one output signal. Referring to box 160, the first, third, and fourth control signals are generated by decoding an instruction. In box 162, the third control signal 46 is applied to the multiplexer 45 to select a plurality of input signals from either the first input port 42 or the second input port 44. Next, in box 164, the logarithm converter 12 performs a logarithmic conversion on the plurality of input signals to generate a corresponding plurality of log values. In box 166, the log values are distributed to the plurality of processing elements 16a–16c. In box 168, each processing element generates at least one term value. In box 170, an inverse-logarithmic conversion is performed on the term values to generate a plurality of converted values. Next, in box 172, the first control signal 31 is applied to the accumulator 32 to configure the accumulator 32 to perform summing operations. In box 174, the accumulator 32 sums selected ones of the plurality of converted values to produce the at least one output signal. In box 176, the fourth control signal 52 is applied to the de-multiplexer 53 in order to transmit the at least one output signal to either the first output port 54 or second output port 56.

Figure 11:
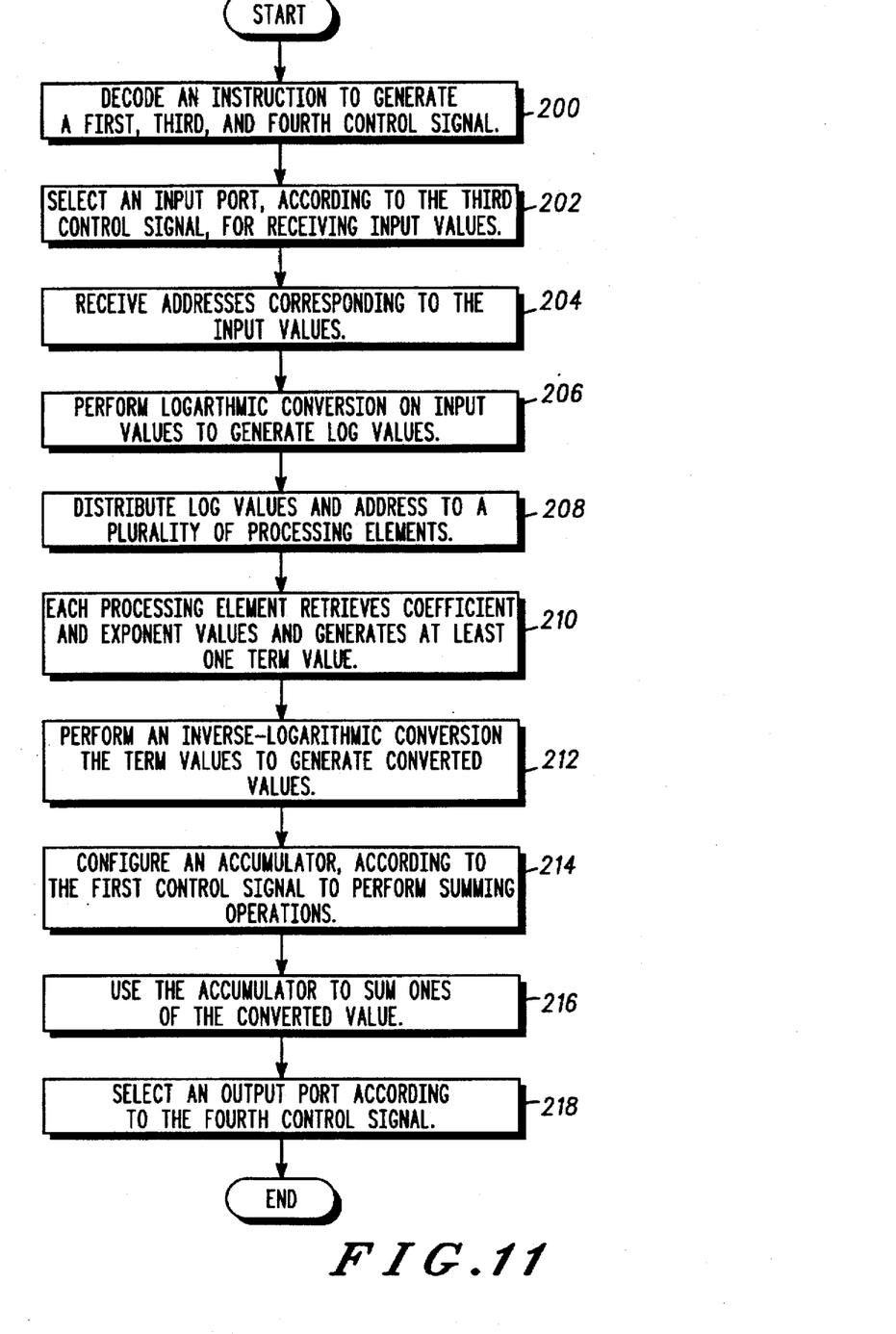
FIG. 11 shows a flow diagram of a method of using the computer processor of FIG. 2 in which addresses are distributed to the processing elements.

FIG. 11 shows a flow diagram of a method of using the computer processor of FIG. 2 in which addresses are distributed to the processing elements. Referring to box 200, the first, third, and fourth control signals are generated by decoding an instruction. In box 202, the third control signal 46 is applied to the multiplexer 45 to select a plurality of input signals from either the first input port 42 or the second input port 44. Next, in box 204, a plurality of addresses corresponding to the input signals are received. In box 206, the logarithm converter 12 performs a logarithmic conversion on the plurality of input signals to generate a corresponding plurality of log values. In box 208, the log values and their corresponding addresses are distributed to the plurality of processing elements 16a–16c. In box 210, each processing element uses the addresses to retrieve coefficient and exponent values corresponding to the input signals and then generates at least one term value. In box 212, an inverse-logarithmic conversion is performed on the term values to generate a plurality of converted values. Next, in box 214, the first control signal 31 is applied to the accumulator 32 to configure the accumulator 32 to perform summing operations. In box 216, the accumulator 32 sums selected ones of the plurality of converted values to produce the at least one output signal. In box 218, the fourth control signal 52 is applied to the de-multiplexer 53 in order to transmit the at least one output signal to either the first output port 54 or second output port 56.

Figure 12:
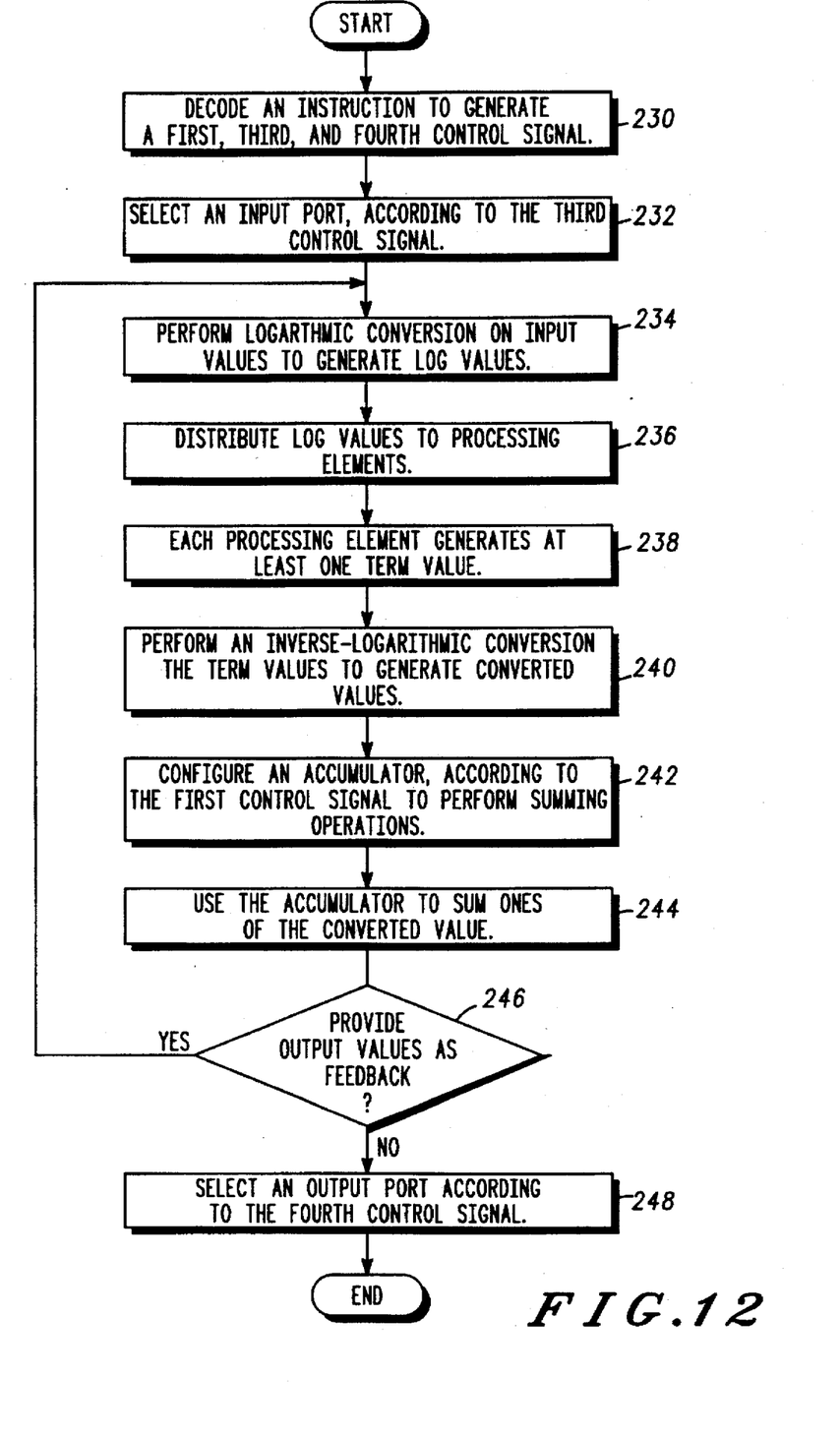
FIG. 12 shows a flow diagram of a method of using the computer processor of FIG. 2 in which output signals are utilized as feedback.

FIG. 12 shows a flow diagram of a method of using the computer processor of FIG. 2 in which output signals are utilized as feedback. Referring to box 230, the first, third, and fourth control signals are generated by decoding an instruction. In box 232, the third control signal 46 is applied to the multiplexer 45 to select a plurality of input signals from either the first input port 42 or the second input port 44. Next, in box 234, the logarithm converter 12 performs a logarithmic conversion on the plurality of input signals to generate a corresponding plurality of log values. In box 236, the log values are distributed to the plurality of processing elements 16a–16c. In box 238, each processing element generates at least one term value. In box 240, an inverse-logarithmic conversion is performed on the term values to generate a plurality of converted values. Next, in box 242, the first control signal 31 is applied to the accumulator 32 to configure the accumulator 32 to perform summing operations. In box 244, the accumulator 32 sums selected ones of the plurality of converted values to produce the at least one output signal.

In decision box 246 a check is made to determine whether the output signals are to be provided as feedback. If so, the method returns to box 234 and the output signals are provided as inputs to the logarithm converter 12 via the feedback switch 36. If not, the method terminates. The determination of whether or not to provide feedback is based on the instruction decoded by the control unit 39.

In box 248, the fourth control signal 52 is applied to the de-multiplexer 53 in order to transmit the at least one output signal to either the first output port 54 or second output port 56.

Thus, in summary, there has been described herein a concept, as well as several embodiments, including a preferred embodiment, of a computer processor which performs logarithmic conversions on input signals prior to performing arithmetic operations on the input signals, thus allowing the processor to perform mathematical operations at dramatically greater speeds while reducing the size and complexity of the processor in an integrated circuit. By operating on logarithmic values rather than numeric input signals, the processing elements can be implemented using significantly less silicon space.

Because various embodiments of the present invention provide a computer processor which includes dual input and output ports, they perform with greatly increased data throughput rates.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method for using a computer processor, having an input port and a plurality of processing elements, to generate at least one output signal, the method comprising the following steps:

(a) receiving a plurality of input signals on the input port;

(b) performing a logarithmic conversion on the plurality of input signals to generate a plurality of log values;

(c) distributing the plurality of log values to the plurality of processing elements;

(d) each of the plurality of processing elements generating at least one term value;

(e) performing an inverse-logarithmic conversion on the at least one term value from each of the plurality of processing elements to generate a plurality of converted values;

(f) decoding an instruction to configure an accumulator to perform summing operations;

(g) summing ones of the plurality of converted values to produce the at least one output signal; and (h) including the at least one output signal in the plurality of input signals.

2. The method of claim 1, wherein the at least one term value has a form:

$$y = w + \sum_{i=m}^{n} g_i x_i,$$

wherein y represents the at least one term value, w represents a coefficient value, $g_i$ represents an exponent value, $x_i$ represents one of the plurality of log values, m and n are integers, and i is an integer in the range m to n.

3. The method of claim 2, further comprising the following steps:

receiving a plurality of addresses corresponding to the plurality of input signals;

distributing the plurality of addresses to the plurality of processing elements; and each of the plurality of processing elements using the plurality of addresses to retrieve from a cache memory the coefficient value and the exponent value corresponding to one of the plurality of input signals.

4. The method of claim 1, further comprising the following step:

(i) repeating steps (b)–(g).

5. The method of claim 1, wherein step (f) occurs prior to step (a).

6. The method of claim 1, wherein step (f) includes the substep of:

configuring the accumulator to generate an output signal by summing converted values corresponding to selected ones of the plurality of processing elements.

7. The method of claim 1, wherein step (f) includes the substep of:

configuring the accumulator to generate an output signal by summing converted values corresponding to selected ones of the plurality of processing elements to produce a sequence of adder outputs, over time, and summing the sequence of adder outputs to produce the output signal.

8. The computer processor of claim 1, wherein step (f) includes the substep of:

configuring the accumulator to generate a plurality of output signals, wherein each of the plurality of output signals is generated by summing converted values corresponding to one of the plurality of processing elements.

9. The method of claim 1, further comprising the step of:

generating at least one output address which corresponds to the at least one output signal.

10. The method of claim 1, wherein the instruction is a digital word having a plurality of fields.

11. The method of claim 10, wherein the plurality of fields include a chip ID field which corresponds to the computer processor.

12. In a computer processor having a first input port, a second input port, and a plurality of processing elements, a method for generating at least one output signal, the method comprising the following steps:

generating a first control signal, a second control signal, a third control signal, and a fourth control signal by decoding an instruction;

applying the third control signal to a multiplexer to select a plurality of input signals from either the first input port or the second input port;

including the at least one output signal in the plurality of input signals in accordance with the second control signal;

performing a logarithmic conversion on the plurality of input signals to generate a plurality of log values;

distributing the plurality of log values to the plurality of processing elements;

each of the plurality of processing elements generating at least one term value;

performing an inverse-logarithmic conversion on the at least one term value from each of the plurality of processing elements to generate a plurality of converted values;

applying the first control signal to an accumulator to configure the accumulator to perform summing operations;

summing ones of the plurality of converted values to produce the at least one output signal; and applying the fourth control signal to a de-multiplexer to transmit the at least one output signal to either a first output port or a second output port.

13. The method of claim 12, wherein the at least one term value has a form:

$$y = w + \sum_{i=m}^{n} g_i x_i,$$

wherein y represents the at least one term value, w represents a coefficient value, $g_i$ represents an exponent value, $x_i$ represents one of the plurality of log values, m and n are integers, and i is an integer in the range m to n.

14. The method of claim 13, further comprising the following steps:

receiving a plurality of addresses corresponding to the plurality of input signals;

distributing the plurality of addresses to the plurality of processing elements; and each of the plurality of processing elements using the plurality of addresses to retrieve from a cache memory the coefficient value and the exponent value corresponding to one of the plurality of input signals.

15. The method of claim 12, wherein the step of applying the first control signal includes the substep of:

configuring the accumulator to generate an output signal by summing converted values corresponding to selected ones of the plurality of processing elements.

16. The method of claim 12, wherein the step of applying the first control signal includes the substep of:

configuring the accumulator to generate a plurality of output signals, wherein each of the plurality of output signals is generated by summing converted values corresponding to one of the plurality of processing elements.

17. The method of claim 12, wherein step of applying the first control signal includes the substep of:

configuring the accumulator to generate an output signal by summing converted values corresponding to selected ones of the plurality of processing elements to produce a sequence of adder outputs, over time, and summing the sequence of adder outputs to produce the output signal.

18. The method of claim 12, further comprising the step of:

generating at least one output address which corresponds to the at least one output signal.

19. The method of claim 12, wherein the instruction is a digital word having a plurality of fields.

20. The method of claim 19, wherein the plurality of fields include a chip ID field which corresponds to the computer processor.

21. A computer processor receiving a plurality of input signals and generating at least one output signal, which comprises:

a logarithm converter for performing a logarithmic conversion on the plurality of input signals to generate a plurality of log values;

a plurality of processing elements, each of the plurality of processing elements having an input and generating as output at least one term value y, wherein $$y = w + \sum_{i=m}^{n} g_i x_i,$$

wherein w represents a coefficient value, $g_i$ represents an exponent value, $x_i$ represents one of the plurality of log values, m and n are integers, and i is an integer in the range m to n;

a bus for distributing the plurality of log values to the inputs of the plurality of processing elements;

an inverse-logarithm converter for performing an inverse-logarithmic conversion on the at least one term value from each of the plurality of processing elements to generate a plurality of converted values;

an accumulator for summing ones of the plurality of converted values to produce the at least one output signal;

a control unit, operatively coupled to the accumulator, for configuring the accumulator to perform operations according to an instruction which is decodable by the control unit; and a feedback switch for providing the at least one output signal to the logarithm converter in accordance with a control signal from the control unit.

22. The computer processor of claim 21, wherein the computer processor receives a plurality of addresses corresponding to the plurality of input signals and further comprises:

an address bus for distributing the plurality of addresses to the plurality of processing elements;

wherein each of the plurality of processing elements includes a cache memory for storing at least one exponent value and at least one coefficient value; and wherein each of the plurality of addresses is usable in retrieving from the cache memory the coefficient value and the exponent value corresponding to one of the plurality of input signals.

23. The computer processor of claim 21, wherein the control unit decodes the instruction to configure the accumulator prior to the computer processor receiving the plurality of input signals.

24. The computer processor of claim 21, wherein the accumulator is configurable to generate an output signal by summing converted values corresponding to selected ones of the plurality of processing elements.

25. The computer processor of claim 21, wherein the accumulator is configurable to generate a plurality of output signals, wherein each of the plurality of output signals is generated by summing converted values corresponding to one of the plurality of processing elements.

26. The computer processor of claim 21, wherein the accumulator is configurable to generate an output signal by summing converted values corresponding to selected ones of the plurality of processing elements to produce a sequence of adder outputs, over time, and summing the sequence of adder outputs to produce the output signal.

27. The computer processor of claim 21, further comprising:

means for generating at least one output address which corresponds to the at least one output signal.

28. The computer processor of claim 21, wherein the instruction is a digital word having a plurality of fields.

29. The computer processor of claim 28, wherein the plurality of fields include a chip ID field which corresponds to the computer processor.

30. The computer processor of claim 21, wherein the plurality of processing elements, the bus, the accumulator, and the control unit are implemented using an integrated circuit.

31. The computer processor of claim 30, wherein the logarithm converter is implemented in a software program which is executable on a separate processor.

32. The computer processor of claim 30, wherein the inverse-logarithm converter is implemented using an integrated circuit.

33. The computer processor of claim 32, wherein the computer processor is implemented using an integrated circuit.

34. A computer processor receiving a plurality of input signals and generating at least one output signal, the computer processor comprising:

a multiplexer for selecting, according to a third control signal, the plurality of input signals from either a first input port or a second input port;

a logarithm converter for receiving the plurality of input signals from the multiplexer and performing a logarithmic conversion on the plurality of input signals to generate a plurality of log values;

a plurality of processing elements, each of the plurality of processing elements having an input and generating as output at least one term value y, wherein $$y = w + \sum_{i=m}^{n} g_i x_i,$$

wherein w represents a coefficient value, $g_i$ represents an exponent value, $x_i$ represents one of the plurality of log values, m and n are integers, and i is an integer between m and n;

a bus for distributing the plurality of log values to the inputs of the plurality of processing elements;

an inverse-logarithm converter, connected to the outputs of the plurality of processing elements, for generating as output a plurality of converted values by performing an inverse-logarithmic conversion on the at least one term value from each of the plurality of processing elements;

an accumulator, receiving the output of the inverse-logarithm converter, for summing ones of the plurality of converted values to produce the at least one output signal, wherein the ones of the converted values are selected according to a first control signal;

a de-multiplexer for transmitting, according to a fourth control signal, the at least one output signal to either a first output port or a second output port;

a control unit for generating the first control signal, the third control signal, and the fourth control signal by decoding an instruction; and a feedback switch for providing the at least one output signal to the logarithm converter in accordance with a second control signal from the control unit.

35. The computer processor of claim 34, wherein the computer processor receives a plurality of addresses corresponding to the plurality of input signals and further comprises:

an address bus for distributing the plurality of addresses to the plurality of processing elements;

wherein each of the plurality of processing elements includes a cache memory for storing at least one exponent value and at least one coefficient value; and wherein each of the plurality of addresses is usable in retrieving from the cache memory the coefficient value and the exponent value corresponding to one of the plurality of input signals.

36. The computer processor of claim 34, wherein the control unit decodes the instruction to configure the accumulator prior to the computer processor receiving the plurality of input signals.

37. The computer processor of claim 34, wherein the accumulator is configurable to generate an output signal by summing converted values corresponding to selected ones of the plurality of processing elements.

38. The computer processor of claim 34, wherein the accumulator is configurable to generate a plurality of output signals, wherein each of the plurality of output signals is generated by summing converted values corresponding to one of the plurality of processing elements.

39. The computer processor of claim 34, wherein the accumulator is configurable to generate an output signal by summing converted values corresponding to selected ones of the plurality of processing elements to produce a sequence of adder outputs, over time, and summing the sequence of adder outputs to produce the output signal.

40. The computer processor of claim 34, further comprising:

means for generating at least one output address which corresponds to the at least one output signal; and means for transmitting, according to the fourth control signal, the at least one output address to either the first output port or the second output port.

41. The computer processor of claim 34, wherein the instruction is a digital word having a plurality of fields.

42. The computer processor of claim 41, wherein the plurality of fields include a chip ID field which corresponds to the computer processor.

43. The computer processor of claim 41 wherein the plurality of processing elements, the bus, the accumulator, and the control unit are implemented using an integrated circuit.

44. The computer processor of claim 43, wherein the logarithm converter is implemented in a software program which is executable on a separate processor.

45. The computer processor of claim 43, wherein the inverse-logarithm converter is implemented using an integrated circuit.

46. The computer processor of claim 45, wherein the computer processor is implemented using an integrated circuit.

* * * * *